United States Patent
Heinrich et al.

(10) Patent No.: US 6,775,878 B2
(45) Date of Patent: Aug. 17, 2004

(54) WIPER ARM, AND WINDOW WIPING DEVICE, IN PARTICULAR FOR A MOTOR VEHICLE

(75) Inventors: Laurent Heinrich, Illkirch-Graffenstaden (FR); Karlheinz Lorenz, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 10/209,132

(22) Filed: Jul. 31, 2002

(65) Prior Publication Data
US 2003/0024064 A1 Feb. 6, 2003

(30) Foreign Application Priority Data
Aug. 2, 2001 (DE) ........................ 101 38 003

(51) Int. Cl.[7] ................ B60S 1/32; B60S 1/34
(52) U.S. Cl. ................ 15/250.21; 15/250.351
(58) Field of Search ................ 15/250.21, 250.23, 15/250.351, 250.352, 250.31, 250.3; 304/445

(56) References Cited

U.S. PATENT DOCUMENTS

| | | | | |
|---|---|---|---|---|
| 3,076,991 A | * | 2/1963 | Macpherson | 15/250.23 |
| 5,860,186 A | * | 1/1999 | Schael et al. | 15/250.21 |
| 5,884,357 A | * | 3/1999 | Schill et al. | 15/250.21 |
| 6,119,301 A | * | 9/2000 | Nakatsukasa et al. | 15/250.21 |

FOREIGN PATENT DOCUMENTS

| | | | | |
|---|---|---|---|---|
| DE | 44 44 066 A1 | 6/1996 | | |
| EP | 0182123 | * | 5/1986 | 15/250.21 |

* cited by examiner

*Primary Examiner*—Gary K. Graham
(74) *Attorney, Agent, or Firm*—Michael J. Striker

(57) ABSTRACT

A window wiping device has a wiper arm which has a first crank and a second crank, a mounting part which is mountable by the first crank and the second crank in two points, the mounting part having at least a first plate and a second plate arranged substantially parallel to one another, at least one of the cranks being mounted rotatably between the plates.

9 Claims, 5 Drawing Sheets

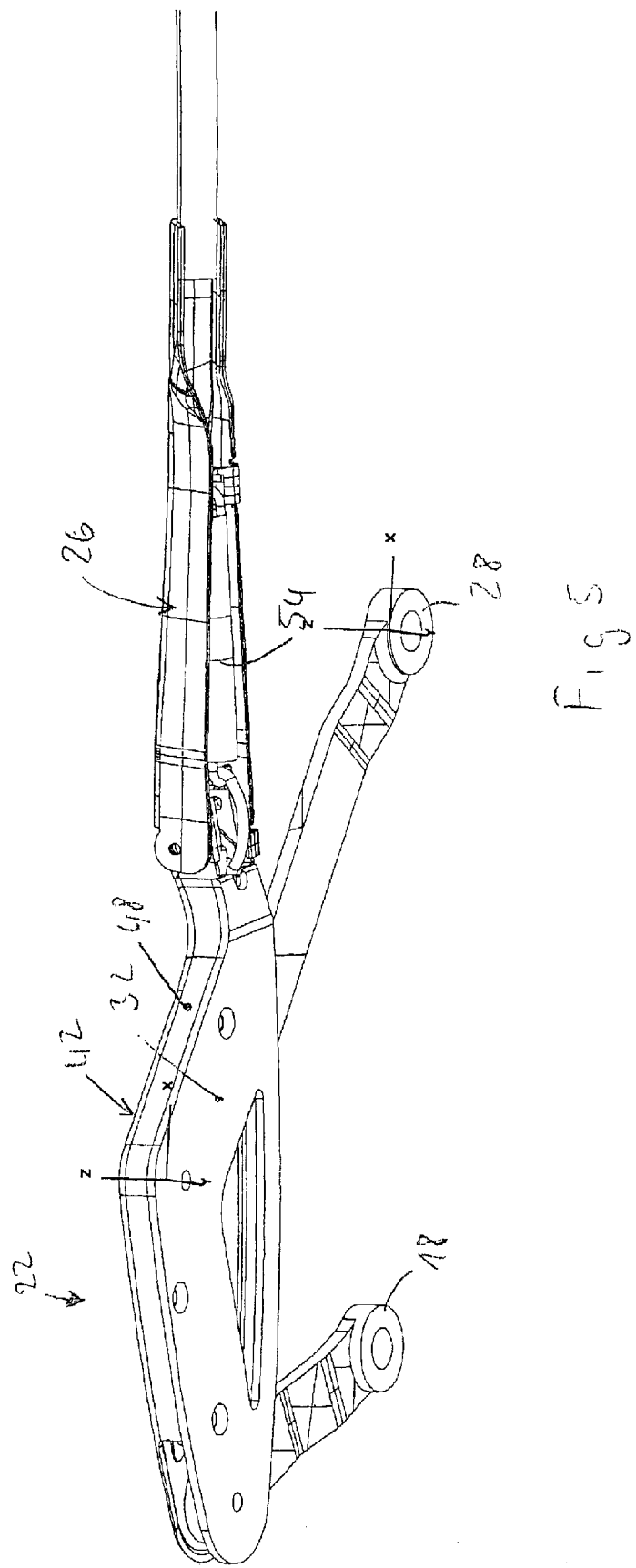

WIPER ARM, AND WINDOW WIPING DEVICE, IN PARTICULAR FOR A MOTOR VEHICLE

BACKGROUND OF THE INVENTION

The present invention relates to a wiper arm and a window wiper device, in particular for a motor vehicle.

Numerous wiper arms for window wiping devices with a four-joints are known, as disclosed for example in the German patent document DE 44 44 066 A1. The wiper arm is composed in this window wiping device of a joint part on which at least indirectly a wiper blade is arranged, and a mounting part which connects the wiper arm with the wiper shaft which is swingingly movable during the operation. The mounting part is composed substantially of a short elongated portion which at one end is rotatably connected with the hinge part. Two cranks are coupled to the mounting part. One of the cranks is swingly driven by a wiper drive, while the other crank is permanently connected with the window wiping device or the vehicle chassis and serves for a stroke generation.

Since great forces must be transmitted between the cranks and the mounting part, the cranks and the mounting part must be formed in this region especially stable and therefore must have a relatively great structural high.

SUMMARY OF THE INVENTION

Accordingly, it is an object of the present invention to provide a wiper arm, as well as a window wiping device for a motor vehicle which avoids the disadvantages of the prior art.

In keeping with these objects and with others which will become apparent hereinafter, one feature of the present invention resides, briefly stated in a wiper arm in which the mounting part has at least a first plate and a second plate arranged substantially parallel to it, and at least one of the cranks is rotatably mounted between the plates.

When the wiper arm is designed in accordance with the present invention, then due to the arrangement of the both cranks between two plates of the mounting part, a small structural height of the wiper arm is obtained. Therefore the aerodynamics of the window wiping device is improved and wind noise on the window wiping device is reduced.

In accordance with a further feature of the present invention the both plates are connected with one another by a spacer piece. Therefore, the bearing forces are reduced and the service life of the wiper arm is further increased.

It is especially advantageous when in accordance with a further feature of the present invention one of the plates has a pocket or an opening, in which a pin engages, being rotatably supported by one of the cranks. Thereby the pin is reliably held between the plates and can be easily used in the mass production.

The pin can extend through one of the plates over its full length and can be mounted at the side of the plate which faces away from the crank.

The pin obtains a reliable hold and can be produced in the mass production in a simple manner, for example by insertion and riveting on the plate.

It is especially advantageous when in accordance with another feature of the present invention at least one of the plates is formed as a cast part. Cast parts are manufactured in a cost favorable manner, and pockets for receiving the pins or spacer members can be integrated simply in the plate, due to a significant freedom during the molding.

Furthermore, it is advantageous when at least one pin is pressed in a ball bearing, and the ball bearing is pressed in a recess in the crank. In this way the bearing is directly integrated in the crank so that the structural height can be further reduced. In accordance with another feature of the present invention a window wiper device is proposed, which includes a window wiping device for a motor vehicle, comprising a wiper arm; a wiper blade supported by said wiper arm; and means for moving said wiper arm relative to a window of a vehicle, said wiper arm including a first crank and a second crank, a mounting part which is mountable by said first crank and said second crank in two points, said mounting part having at least a first plate and a second plate arranged substantially parallel to one another, at least one of said cranks being mounted rotatably between said plates.

When the window wiping device is designed in accordance with the present invention it is easily mountable in a vehicle and has a low structural height of its wiper arm.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a view showing a wiper arm in accordance with the present invention.

DESCRIPTION OF THE PREFERRED EMBODIMENTS

Figure 1:
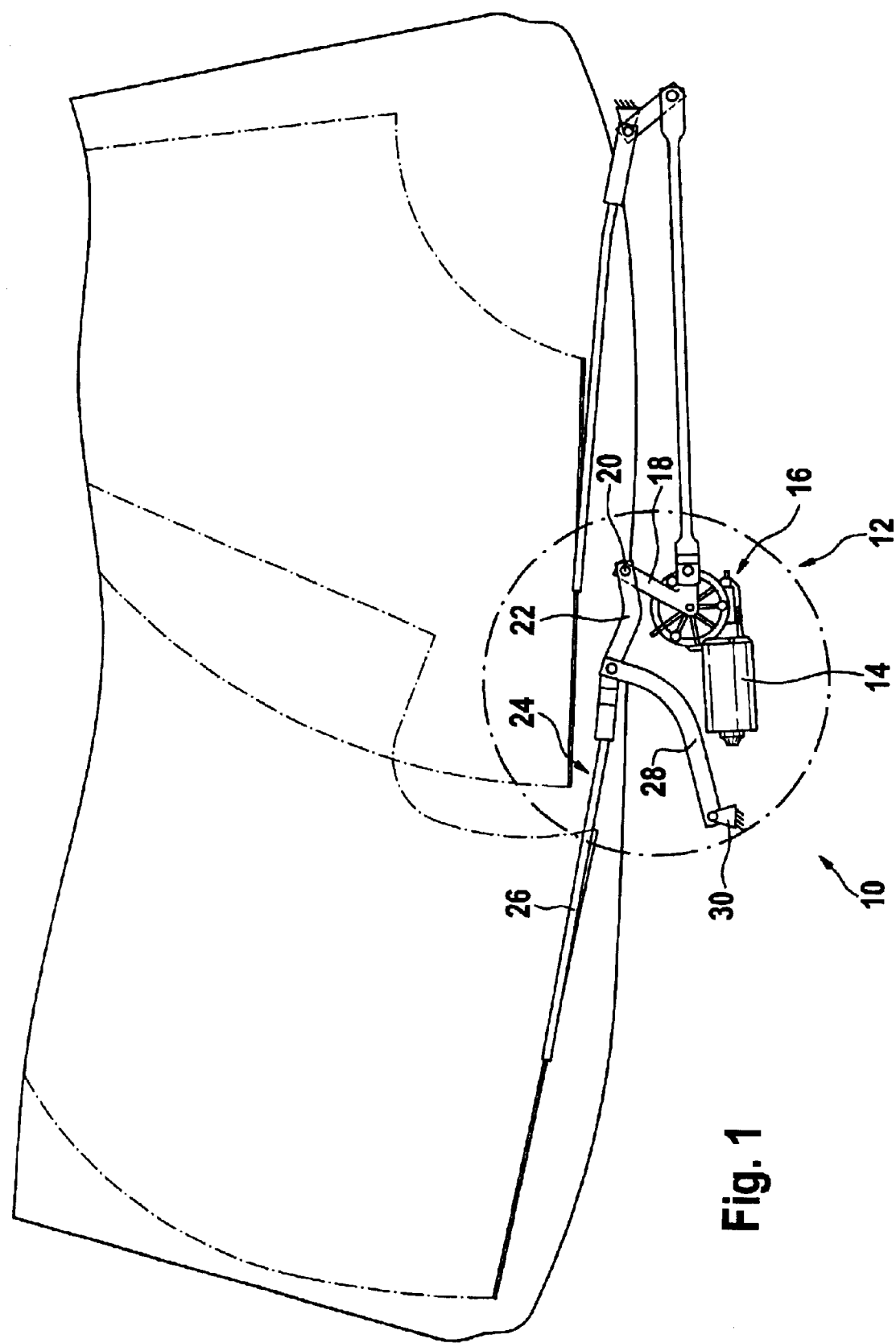
FIG. 1 is a view schematically showing a window wiping device in accordance with the present invention.

FIG. 1 shows a window wiping device in accordance with the present invention which is identified as a whole with reference numeral 10. The window wiping device has a four joint identified with reference numeral 12. The window wiping device includes substantially a drive aggregate 14 which provides driving of the four joint 12 of a wiper arm 24 in a swinging manner. The wiper arm 24 is elongated and has a hinge part 26 and a mounting part 22, with which it is coupled to the four joint 12 through two cranks 18 and 28. Furthermore the wiper arm 24 at its end which faces away from the mounting part 22 is hingedly connected with a wiper blade 13.

The drive aggregate 14 is formed typically as an electric motor with a worm gear transmission 16. It drives a first crank 18 of the four joint 12 of the window wiping device 10. The first crank 18 is connected by its driven end 20 with the mounting part 22 at the end which faces away from the blade.

The second crank 28 at its end is rotatably connected by a fixed bearing 30 with a support part which is not shown for the sake of clarity of the drawing. For example, the support part is a support pipe of the window wiping device 10. The other end of the second crank 28 is hingedly connected to the mounting part 22 at a distance between the driven end 20 of the first crank 18.

In the operation great forces acts on the cranks 18, 22, in particular at the bearing points which they form with the mounting part 22. Therefore the connecting points between the cranks 18, 28 and the mounting part 22 must be dimensioned correspondingly to withstand the forces.

Figure 2:
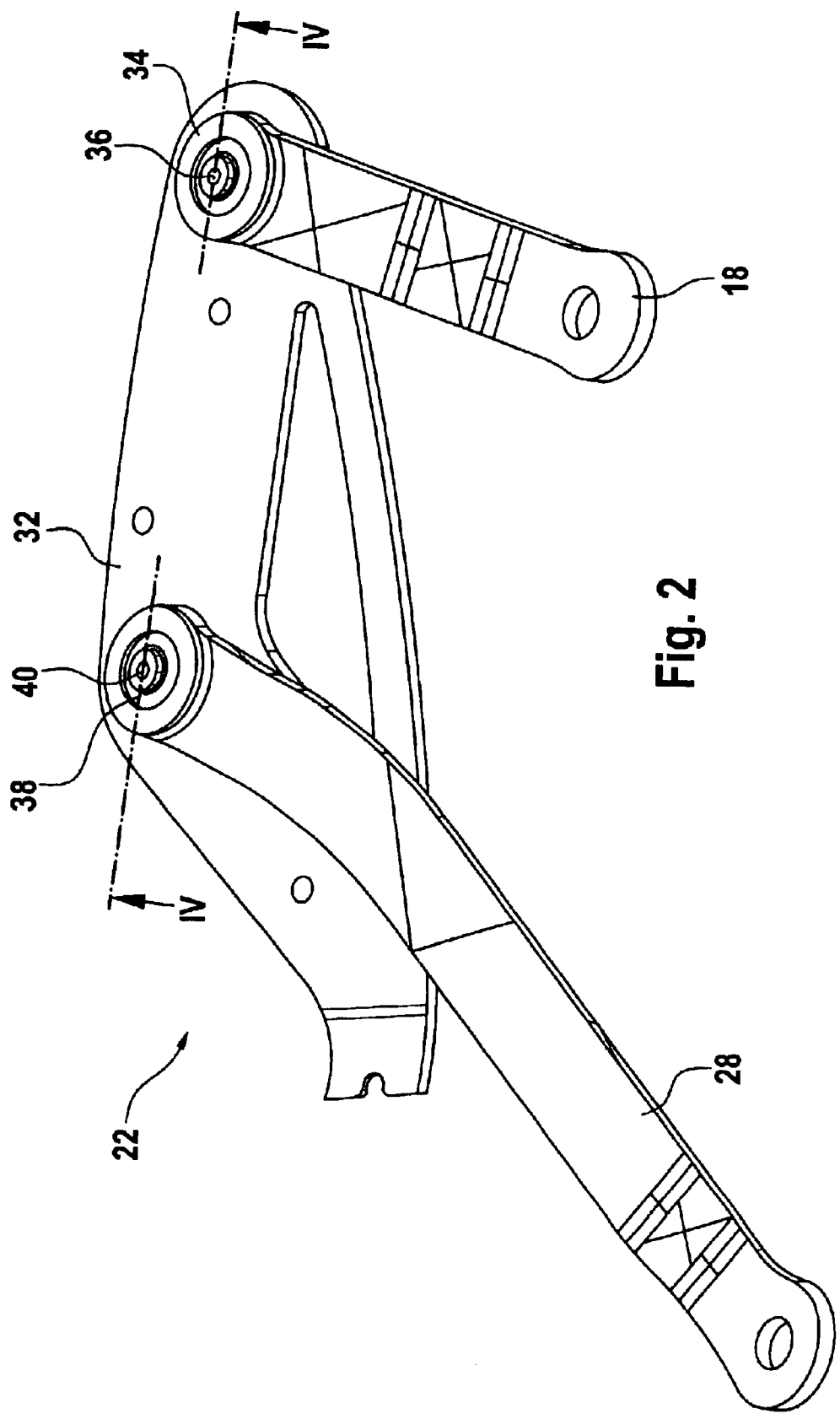
FIG. 2 is a view showing a lower part of a wiper arm in accordance with the present invention in a perspective.

In FIG. 2 the lower part of a mounting part 22 of an inventive wiper arm 24 is shown in a perspective. A first crank 18 and a second crank 28 are rotatably mounted on a first plate 32. The first crank 18 at its free end has a first bearing 34, which is pressed in a recess at an end of the first crank 18. Each bearing surrounds the first pin 36, which is fixedly pressed on the first plate 32.

Analogously, the second crank 28 at its free end also has a recess, in which a second bearing 38 is pressed. The second bearing 38 surrounds the second pin 40, so that the second crank is supported rotatably around the pin 40. Typically the bearings 34 and 38 are formed as sealed bearings, to prevent the penetration of water or dirt. The both pins are pressed in corresponding bearings 34, 38, and the bearings 34, 38 are pressed in the corresponding cranks 18, 28 and calked around.

The pins 36, 40 are driven into the first plate 32 and riveted there. The first plate 32 has a substantially triangular design with two short sides and a long base. The both bearings 34, 38 are arranged in the region of the two corners of the triangle, which enclose a shorter side. The hinge part 26 of the wiper arm 24 is arranged at the third corner of the triangle, as an elongation of the base of the triangle as shown in FIG. 3.

In order to reduce the weight of the wiper arm 24, the first plate 32 can be provided with recesses. However, they must be arranged so that the stability, in particular the torsion strength of the plate, is not negatively affected.

Figure 3:
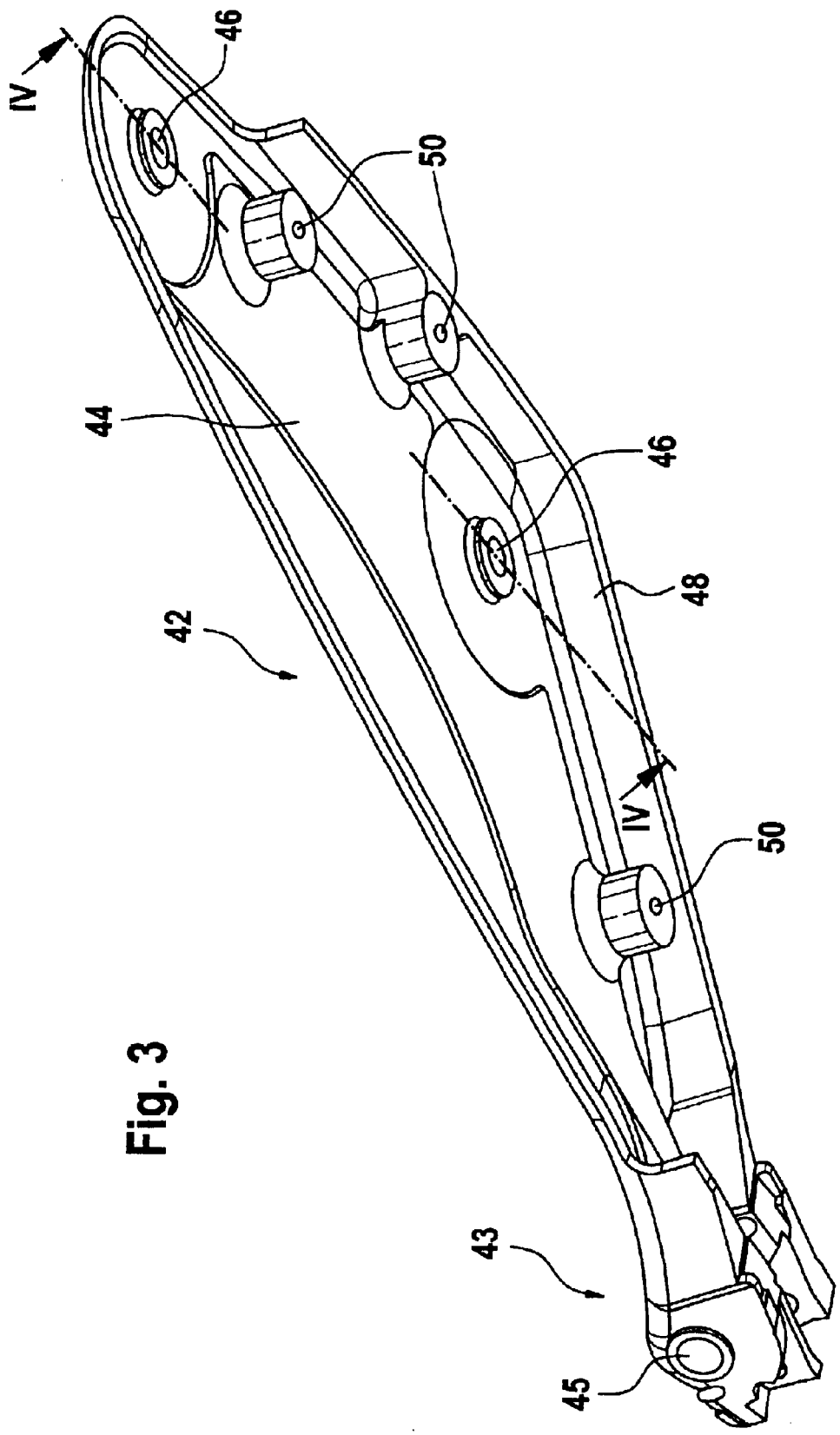
FIG. 3 is a view showing an upper part of a wiper arm in accordance with the present invention in a perspective.

The second plate 42 of the mounting part 22 is shown in a perspective in FIG. 3. The second plate 42 includes a top surface 44 which has a size and a shape corresponding to the first plate 32. The second plate 42 is provided at corresponding locations with pockets 46 for receiving the pins 36 and 40. The pockets are located in the region of a corner which faces away from the base and a corner which faces away from the hinge part.

The pockets 46 have a shape which substantially correspond to a hollow cylinder, so that the cylindrical pins 36, 40 can be inserted in the pockets. Furthermore, the triangular top surface 34 is provided with a collar 48 at its sides which face away from the base. The collar 48 has a height selected so that the assembled plates 32, 42 form at least partially closed housing.

The second plate 42 has a hinge 43 at the end of the base which faces away from the first crank 18. The hinge part 26 is hingedly connected with the hinge 43. For this purpose a hinge part pin 45 is located between two portions of the collar 48. Naturally, also corresponding raised portions can be arranged on the collar 48 and easily produced by casting.

The collar 48 is open so that the movement space of the first and second cranks 18, 28 is not impedingly trimmed. In order to stabilize the distance between the plate 32, 44, cylindrical raised portions formed as spacer pipes 50 are arranged on the top surface. They have an opening with an inner thread.

Figure 4:
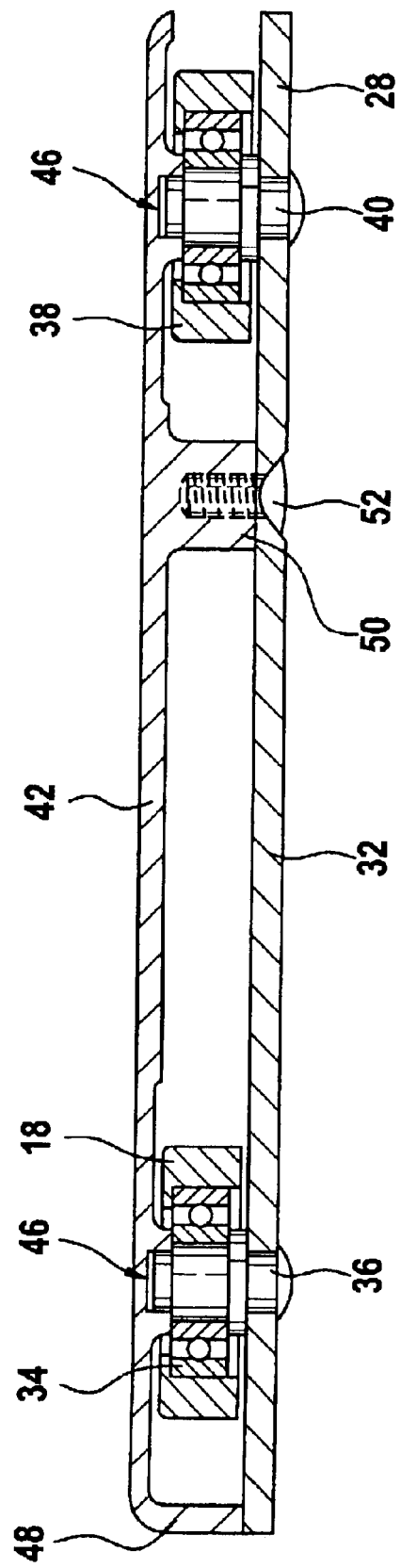
FIG. 4 is a view showing a section of the wiper arm in accordance with the present invention.

FIG. 4 shows a section through a mounting part 32 along the both bearings 34, 38.

The pins 36,40 are pressed in the bearings 34, 38, and formed typically as ball bearings or needle bearings. The bearings 34, 38 are pressed in the recesses of the cranks 18, 28 and calked around. The pins 40, 36 are pressed in the first plate 32 and riveted there. The second plate 42 sits in a cover in hat-like manner on the first plate 32 which is located at a distance from the first plate 32 due to the collar 48 and the cylindrical raised portions 50. Naturally, the collar 48 can also extend over the first plate 32 and thereby enclose the first plate 32.

The second plate 42 has correspondingly pockets 46. The pins 36, 40 at the side which faces away from the first plate 32 engage in these pockets. For mounting of the second plate 42, a screw 32 is inserted into an opening of the first plate, which is screwed in the thread of the raised portions 50.

FIG. 5 shows a wiper arm in accordance with the present invention in a perspective. The hinge part 26 on hingedly mounted on the mounting part 22 and carries a not shown wiper blade at its end which faces away from the mounting part. The mounting part includes the first plate 32 on which the second plate 42 is placed, so that the collar 38 is placed on the first plate 32. The hinged part 26 and the mounting part 22 are pre-stressed with one another by a pulling spring 54.

It will be understood that each of the elements described above, or two or more together, may also find a useful application in other types of methods and constructions differing from the types described above.

While the invention has been illustrated and described as embodied in wiper arm, and window wiping device, in particular for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A wiper arm for a window wiping device of a motor vehicle, comprising a first crank and a second crank; a mounting part which is mountable by said first crank and said second crank in two points, said mounting part having at least a first plate and a second plate arranged substantially parallel to one another, at least one of said cranks being mounted rotatably between said plates, and further comprising at least one spacer unitary with one of said plates and having a threaded opening which connects said plates with one another.

2. A wiper arm as defined in claim 1, wherein said spacer is formed as a spacer member.

3. A wiper arm as defined in claim 1, wherein at least one of said plates has a receptacle; and further comprising a pin which engages in said receptacle and rotatably supports at least one of said cranks.

4. A wiper arm as defined in claim 3, wherein said receptacle is formed as a pocket.

5. A wiper arm as defined in claim 3, wherein said receptacle is formed as a hole.

6. A wiper arm as defined in claim 3, wherein said pin extends through said at least one plate over a full length and is mounted at a side of said at least one place which faces away from said at least one crank.

7. A wiper arm as defined in claim 3, wherein at least one of said plates is formed as a cast part.

8. A wiper arm as defined in claim 3, wherein at least one of said cranks has a recess; and further comprising a bearing which is pressed in said recess, said at least one pin being pressed in said bearing.

9. A wiper arm for a window wiping device of a motor vehicle, comprising a first crank and a second crank; a mounting part which is mountable by said first crank and said second crank in two points, said mounting part having at least a first plate and a second plate arranged substantially parallel to one another, at east one of said cranks being mounted rotatably between said plates, wherein at least one of said plates has a receptacle; further comprising a pin which engages in said receptacle and rotatably supports at least one of said cranks, wherein at least one of said cranks has a recess; and further comprising a bearing which is pressed in said recess, said at least one pin being pressed in said bearing.

* * * * *